United States Patent
Lee et al.

(10) Patent No.: US 8,041,222 B2
(45) Date of Patent: Oct. 18, 2011

(54) RADIO OVER FIBER LINK APPARATUS OF TIME DIVISION DUPLEX SCHEME

(75) Inventors: Han-Lim Lee, Seoul (KR); Hoon Kim, Suwon-si (KR); Seong-Taek Hwang, Pyeongtaek-si (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 892 days.

(21) Appl. No.: 11/953,911

(22) Filed: Dec. 11, 2007

(65) Prior Publication Data

US 2008/0145061 A1    Jun. 19, 2008

(30) Foreign Application Priority Data

Dec. 13, 2006  (KR) .................. 10-2006-0127117

(51) Int. Cl.
*H04B 10/00* (2006.01)

(52) U.S. Cl. ............ 398/115; 398/41; 398/42; 370/503; 370/535; 725/125; 725/127; 725/129; 455/561; 455/562.1; 375/215

(58) Field of Classification Search .................. 398/115, 398/41, 135, 139, 141, 153, 182, 193, 198, 398/194, 186, 183, 66, 67, 68, 70, 71, 72, 398/79, 76, 42, 140, 192, 189, 98, 99, 100, 398/103; 370/280, 401, 328, 478, 503, 535, 370/515, 518, 519; 725/126, 127, 128, 129, 725/125; 455/561, 562.1; 375/215, 625, 375/737, 37

See application file for complete search history.

(56) References Cited

U.S. PATENT DOCUMENTS

| | | | | |
|---|---|---|---|---|
| 7,733,825 B2 * | 6/2010 | Kim et al. | ...... | 370/328 |
| 7,773,887 B2 * | 8/2010 | Lee et al. | ...... | 398/115 |
| 7,899,084 B2 * | 3/2011 | Cho et al. | ...... | 370/503 |
| 2003/0228151 A1 * | 12/2003 | Niiho et al. | ...... | 398/115 |
| 2007/0019959 A1 * | 1/2007 | Retnasothie et al. | ...... | 398/115 |

FOREIGN PATENT DOCUMENTS

| | | |
|---|---|---|
| JP | 2000-013326 | 1/2000 |
| KR | 2005-110395 | 11/2005 |
| KR | 2006-066198 | 6/2006 |
| KR | 2007-025572 | 3/2007 |

* cited by examiner

*Primary Examiner* — Hanh Phan
(74) *Attorney, Agent, or Firm* — Cha & Reiter, LLC (57) ABSTRACT

A radio over fiber link apparatus for transmitting/receiving radio frequency up/downlink signals in a TDD mobile communication system. The radio over fiber link apparatus includes a center site for receiving radio frequency signals from an access point of the mobile communication system. The center site has a first electro-optic converter for converting the radio frequency signals into optical signals, bias control of the first electro-optic converter being performed based on the switching of TDD signals; and a remote for transmitting the radio frequency signals to a mobile communication terminal through an antenna. The remote site has a first photoelectric converter for converting the optical signals transmitted through an optical fiber from the center site into radio frequency signals.

15 Claims, 8 Drawing Sheets

RADIO OVER FIBER LINK APPARATUS OF TIME DIVISION DUPLEX SCHEME

CLAIM OF PRIORITY

This application claims the benefit under 35 U.S.C. §119 (a) from an application entitled "Radio over Fiber Link Apparatus of Time Division Duplex Scheme," filed in the Korean Intellectual Property Office on Dec. 13, 2006 and assigned Serial No. 2006-127117, the contents of which are hereby incorporated by reference in its entirety.

BACKGROUND OF THE INVENTION

1. Field of the Invention

The present invention relates to a Radio over Fiber (RoF) link apparatus for transmitting radio frequency up/downlink signals in a mobile communication system. More particularly, the present invention relates to an RoF link apparatus associated with a Time Division Duplex (TDD) scheme.

2. Description of the Related Art

In a mobile communication system, an optical repeater is generally used to expand cell coverage of the system. In particular, optical repeaters employing optical links are broadly used in underground areas such as tunnels, subterranean floors and/or the inside of a building where electric waves do not reach. The optical links are used to transmit radio frequency signals by an optical repeater, and are also used to transmit radio frequency signals to an antenna positioned far away from an access point. Also, the optical repeaters are generally constructed for transmission of radio frequency signals of a wireless mobile communication system, such as a Code Division Multiple Access (CDMA) system or a Wideband CDMA (WCDMA) system.

In mobile communication systems, there are duplex schemes of dividing uplink and a downlink communications so as to transmit radio frequency signals, for example, in a Frequency Division Duplex (FDD) scheme for dividing an uplink and a downlink at different frequencies and a Time Division Duplex (TDD) scheme for dividing an uplink and a downlink at different times.

The FDD scheme has been mainly used in the CDMA system or the WCDMA system, whereas the TDD scheme has been discussed in Wireless Broadband Internet (WiBro) and 4th Generation Mobile Communication (4G), which are new mobile communication systems recently attracting attention.

The TDD scheme is based on the idea that as up/downlink transmission capacity is freely variable and radio frequency up/downlink signals have the same channel characteristic, this variability is regarded as a suitable scheme for a next generation mobile communication system employing multiple antennas. Unlike an existing FDD scheme, the TDD scheme is based on the fact that uplink signals are transmitted at a given (predetermined) time period and downlink signals are transmitted for the duration of the time.

Figure 1:
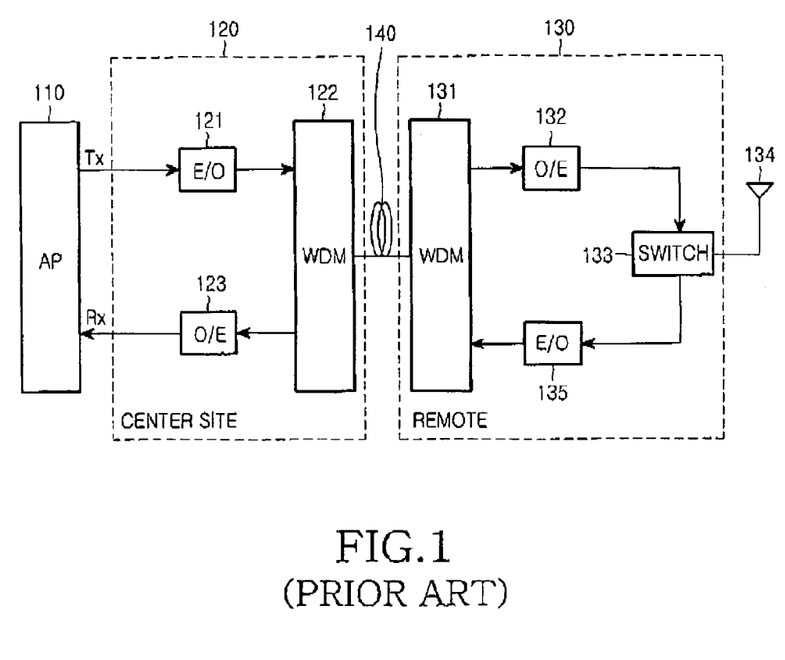
FIG. 1 is a block diagram illustrating a construction of a conventional RoF link apparatus for transmitting/receiving radio frequency up/downlink signals in a TDD mobile communication system.

FIG. 1 is a block diagram illustrating a construction of a conventional RoF link apparatus for transmitting/receiving radio frequency up/downlink signals in a TDD mobile communication system in areas where typical means of transmission/reception is limited/obstructed.

Referring to FIG. 1, the existing RoF link apparatus for transmitting/receiving radio frequency up/downlink signals in a TDD mobile communication system includes a center site 120 and a remote site 130 connected to the center site 120 through an optical fiber 140.

As shown in FIG. 1, the center site 120 is connected for communications with an Access Point (AP) 110 (i.e. an upper layer) of a mobile communication system through a Radio Frequency (RF) cable. The center site 120 receives RF signals transmitted from the AP 110, converts the RF signals into optical signals by the electro-optic converter 121, multiplexes the converted signals by the Wavelength Division Multiplexer/De-multiplexer (WDM) 121, and then transmits the multiplexed signals to the remote site 130 of the optical repeater through the optical fiber 140. Moreover, the center site 120 de-multiplexes the optical signals received from the remote 130 site by the WDM 121, converts the de-multiplexed signals into RF signals by the photoelectric converter 123, and transmits the converted signals to the AP 110 through the RF cable.

The remote site 130 of the optical repeater de-multiplexes the optical signals received from the center site 120 by the WDM 131, converts the de-multiplexed optical signals into RF signals by the photoelectric converter 132, and transmits the converted signals to a terminal (not shown) through an antenna 134. Moreover, the remote site 130 converts the RF signals received from the terminal into optical signals by the electro-optic converter 135, multiplexes the converted signals by the WDM 131, and transmits the multiplexed signals to the center site 120 through the optical fiber 140.

In FIG. 1, a switch 133 comprises a switch for setting paths of uplink signals and downlink signals according to the control of the switching timing signals (not shown).

Meanwhile, the RoF link apparatus uses a limited modulation index to ensure linearity and requires high optical output power to transmit the RF signals with high power within the limited modulation index.

Therefore, a maximum noise source affecting performance of the RoF link apparatus is a Relative Intensity Noise (RIN) occurring in a laser used as an electro-optic converter. The RIN is defined by equation (1) below.

$$RIN(f) = \frac{\langle \Delta P^2 \rangle}{P^2} \qquad (1)$$

Thus, it is understood from the above equation means that the RIN has a value increasing in proportion to the square of the change in optical power. Therefore, the larger the optical power, the larger the RIN value. The RIN usually has a value within a range of approximately −120 to −150 dB/Hz, which monotonically increases up to the relaxation frequency.

The RIN noise amount can be calculated by equation (2) below.

$$P_{RIN} \propto (RIN) \cdot P^2_{in} \cdot R_{responsivity} \cdot R_{Load} \cdot BW_f \qquad (2)$$

In Equation (2), RIN represents a noise value, $P_{in}$ represents optical power, $R_{responsivity}$ represents photoelectric efficiency of PD, $R_{Load}$ represents impedance of the receiver, BW represents a bandwidth, and f represents a frequency.

For example, a RIN value measured after the RIN noise occurring in an electro-optic converter of a center site passes through a photoelectric converter of a remote is calculated as follows. In the following calculation, in order to output thermal noise in dBm, 30 dB is added in the last stage in calculating the thermal noise power.

RIN=−150 dB/Hz, $P_{in}$=0 dBm, $R_{responsivity}$=1, $R_{Load}$=50 ohm, BW=100 KHz $$P_{RIN} = [-150 + (-30) \times 2 + 0 + 17 + 50] + 30$$

$$= -113 \text{ dBm}/100 \text{ KHz}$$

A result of the above calculation shows a RIN having a small value of −113 dBm/100 KHz. Therefore, even a TDD system does not have a large problem with RIN noise.

However, there may be a probability that the RIN noise has a value, which may be degraded without limitation depending on operation conditions of a laser (e.g. an operation frequency of the laser, a bandwidth, etc). Unlike the $2^{nd}$ generation mobile communication system operating at a frequency of around 2 GHz, the next generation mobile communication system such as an IMT-advanced system operates at a frequency of around 4 GHz and requires an increased bandwidth of around 100 MHz. Therefore, in consideration of these conditions, the situation may greatly change as compared to 2nd generation.

$$RIN=-120 \text{ dB/Hz}, P_{in}=0 \text{ dBm}, R_{responsivity}=1,$$
$$R_{Load}=50 \text{ ohm}, BW=100 \text{ MHz}$$

$$PRIN = [-120 + (-30) \times 2 + 0 + 17 + 80] + 30$$
$$= -53 \text{ dBm}/100 \text{ MHz}$$

On an assumption that RIN noise having a value of −53 dBm is detected in the photoelectric converter of the remote having the construction shown in FIG. 1, the value of noise, which is generated by crosstalk of a transmission path (Tx path) and input to a reception path (Rx path), is calculated as follows. A result of the calculation shows such that noise would be large enough as to saturate the capacity of a reception side, thereby causing the communication to be impossible.

−53 dBm (output level of photoelectric converter in Rx mode, embodiment) +

80 dB (total RF Gain of HPA, embodiment) −

25 dB (Switch isolation) = 2 dBm/100 MHz

As described above with reference to a conventional construction such as shown in FIG. 1, a reception side has a certain noise level, which increases when a high level of noise is input to an input side of an LNA, so that the reception side has a low SNR value and thus has degraded reception sensitivity. Therefore, a TDD next generation mobile communication system which uses a laser having a poor RIN value or requires a broad bandwidth cannot employ an RoF link apparatus with a conventional construction.

SUMMARY OF THE INVENTION

Accordingly, the present invention has been made in part to solve at least some of the above-mentioned problems. The present invention provides an apparatus and a method which can minimize deterioration of reception sensitivity due to RIN noise occurring in an electro-optic converter of an RoF link apparatus for transmitting radio frequency up/downlink signals in a TDD mobile communication system.

The present invention also provides a method for using an RoF link apparatus that is operable with a TDD next generation mobile communication system which uses a laser having a poor RIN value, or requiring a broad bandwidth and a high operational frequency.

In accordance with an exemplary aspect of the present invention, there is provided a radio over fiber link apparatus for transmitting/receiving radio frequency up/downlink signals in a TDD mobile communication system, the radio over fiber link apparatus including: a center site for receiving radio frequency signals from an access point of the mobile communication system, the center site having a first electro-optic converter for converting the radio frequency signals into optical signals, bias control of the first electro-optic converter being performed based on the switching of TDD signals; and a remote for transmitting the radio frequency signals to a mobile communication terminal through an antenna, the remote having a first photoelectric converter for converting the optical signals transmitted through an optical fiber from the center site into radio frequency signals.

BRIEF DESCRIPTION OF THE DRAWINGS

The above and other exemplary aspects, features and advantages of the present invention will be more apparent from the following detailed description taken in conjunction with the accompanying drawings, in which.

DETAILED DESCRIPTION OF THE INVENTION

Hereinafter, embodiments of the present invention will be described with reference to the accompanying drawings. The drawings are provided for purposes of illustration and the claimed invention is not limited to the examples shown in the drawings. Furthermore, for the purposes of clarity and simplicity, a detailed description of known functions and configurations incorporated herein will be omitted when the inclusion of such known functions and configurations may obscure appreciation of the subject matter of the present invention.

Figure 2:
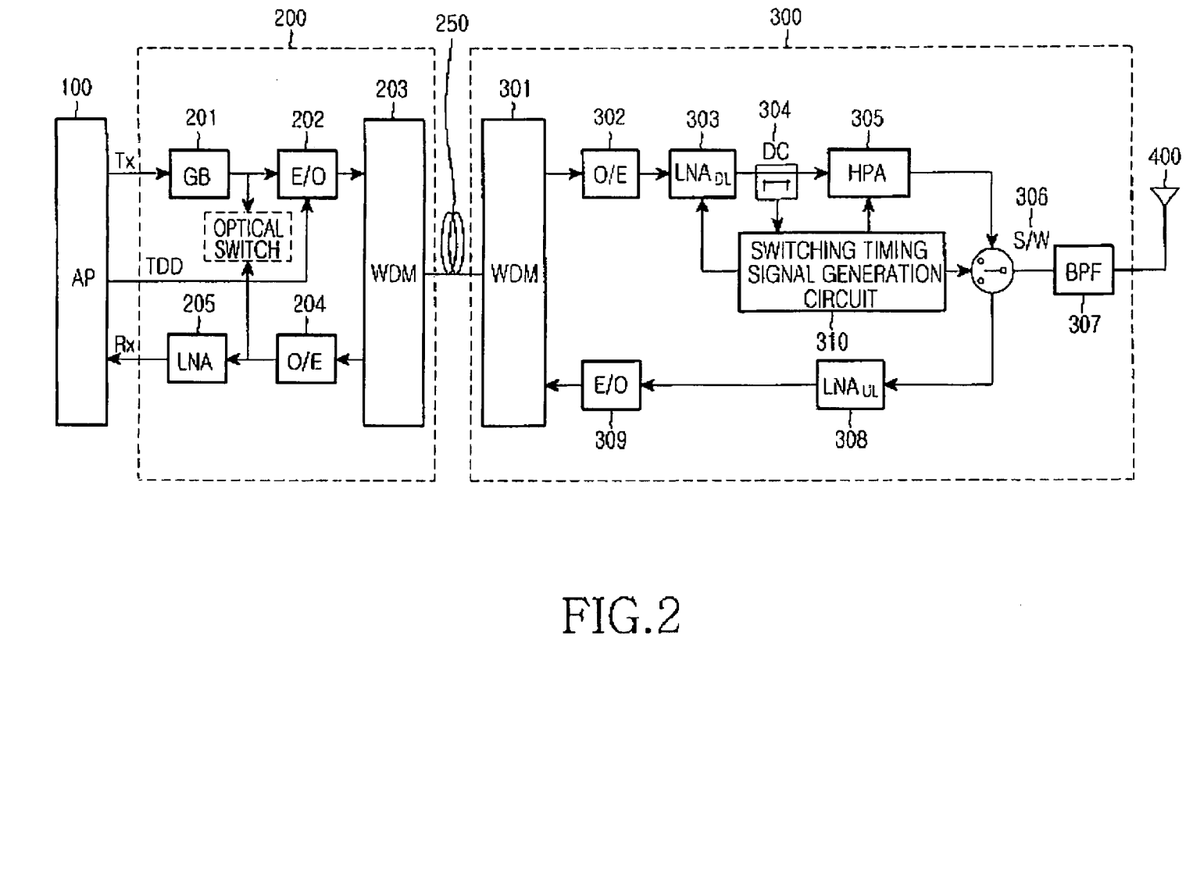
FIG. 2 is a block diagram illustrating a construction of an RoF link apparatus for transmitting/receiving radio frequency up/downlink signals in a TDD mobile communication system according to a first exemplary embodiment of the present invention.

FIG. 2 is a block diagram illustrating a construction of an RoF link apparatus for transmitting/receiving radio frequency up/downlink signals in a TDD mobile communication system according to a first exemplary embodiment of the present invention.

Referring to FIG. 2, the RoF link apparatus according to the present exemplary embodiment includes a center site 200 connected with an Access Point (AP) 100 of the mobile communication system via a transmission means such as an RF cable and a remote site 300 (herein after "remote") of an optical repeater connected with the center site 200 through an optical fiber 250. The center site 200 converts RF signals received from the AP 100 into optical signals through electro-optic conversion, transmits the converted signals to the remote 300 of the optical repeater through the optical fiber 250. The center site 200 also converts optical signals received from the remote 300 into RF signals through photoelectric conversion and transmits the converted signals to the AP 100 through an RF cable. The remote 300 of the optical repeater converts the optical signals received from the center site 200 into RF signals through photoelectric conversion and transmits the converted signals to a portable terminal (not shown) through an antenna 400. The remote 300 also converts RF signals received from a portable terminal into optical signals through electro-optic conversion and transmits the converted signals to the center site 200 through the optical fiber 250.

The constructions of the center site 200 and the remote 300 of the optical repeater will be described in more detail herein below.

Still referring to FIG. 2, the center site 200 includes a gain block 201, an electro-optic converter (E/O) 202, a Wavelength Division Multiplexer (WDM) 203, a photoelectric converter (O/E) 204, and an Low Noise Amplifier (LNA) 205. The remote 300 of the optical repeater includes a WDM 301, a photoelectric converter 302, a downlink low noise amplifier (LNADL) 303, a DC coupler 304, a HPA 305, a switch 306, a Band-Pass Filter (BPF) 307, an uplink low noise amplifier (LANUL) 308, an electro-optic converter E/O 309, and a switching timing signal generation circuit 310.

An example of the process of data transmission in a downlink and an uplink between the center site 200 and the remote 300 constructed as described above will be explained with reference to FIG. 2.

First, in the case of a downlink (Tx mode), RF signals transmitted from the AP 100 (i.e. an upper layer) through an RF cable are delivered to the gain block 201 of the center site 200. The gain block 201 reduces a noise component of the RF signals and amplifies a signal component, and then delivers the amplified signals to the electro-optic converter 202.

According to the present invention, the electro-optic converter 202 converts the received RF signals into optical signals and transmits the converted signals to the WDM 203. In this case, bias control of the electro-optic converter 202 is performed based on the switching of TDD signals supplied from the AP 100. The bias control operation will be described in more detail herein below.

The WDM 203 arranged in the center site multiplexes multi-channel optical signals received from the electro-optic converter 202 at different wavelengths and transmits the multiplexed signals to the WDM 301 of the remote 300 through the optical fiber 250. The WDM 301 of the remote 300 de-multiplexes the multiplexed optical signals at different wavelengths and delivers the de-multiplexed optical signals to the photoelectric converter 302. The photoelectric converter 302 converts the optical signals into RF signals through photoelectric conversion and delivers the resulting signals to the LNADL 303.

The LNADL 303 eliminates noise, amplifies only a signal component, and then delivers the resulting signals to the HPA 305. The HPA 305 amplifies the RF signals until they have a Root Mean Square (RMS) power sufficient for wireless transmission and then delivers the amplified signals to a switch 306. The switch 306 transmits the RF signals to a portable terminal (not shown) through an antenna 400. In this case, only the signals that have passed through the BPF 307 are transmitted.

Meanwhile, still referring to FIG. 2, the coupler 304 of the remote 300 extracts some of the RF signals, transmitted from the LNADL 303 to the HPA 305, and then delivers the resulting signals to the switching timing signal generation circuit 310. The switching timing signal generation circuit 310 analyzes the extracted RF signals, generates switching timing signals to transmit RF signals, and delivers the resulting signals to the switch 306. The switch 306 sets paths according to control of the received switching timing signals so that signals are transmitted to a terminal through an antenna when downlink signals are input to the switch 306, and a path connected with the HPA 305 is isolated and uplink signals are input to the LNAUL 308 when uplink signals are input to the switch 306.

In the case of an uplink (Rx mode), when RF signals are received through the antenna 400, the LNAUL 308 eliminates noise, amplifies only a signal component, and then delivers the resulting signals to the electro-optic converter 309. In turn, the electro-optic converter 309 converts the RF signals into optical signals through photoelectric conversion and delivers the converted signals to the WDM 301 of the remote 300. The WDM 301 multiplexes the optical signals received from the electro-optic converter 309 at different wavelengths and transmits the resulting signals to the WDM 203 of the center site 200 through the optical fiber 250. Herein, for the electro-optic converter 309 also, it is possible to perform the bias control based on the switching of the TDD signals supplied from the AP 100. However, the electro-optic converter 202 of the center site 200 is necessarily based on the switching of the TDD signal for the bias control, while the electro-optic converter 309 of the remote 300 may selectively apply the switching of the TDD signals.

The WDM 203 of the center site 200 de-multiplexes the multiplexed optical signals into resulting signals having different wavelengths and delivers the resulting signals to the photoelectric converter 204. Then, the photoelectric converter 204 converts optical signals into RF signals through photoelectric conversion and delivers the resulting signals to the LNA 205.

The LNA 205 placed in the center site 200 amplifies RF signals until they have RMS power to transmit the amplified signals to the AP 100, and delivers the resulting signals to the AP 100 through the RF cable.

Hereinafter, a construction of the electro-optic converter and a bias control operation according to an exemplary aspect of the present invention will be described with reference to FIGS. 3 and 4.

Figure 3:
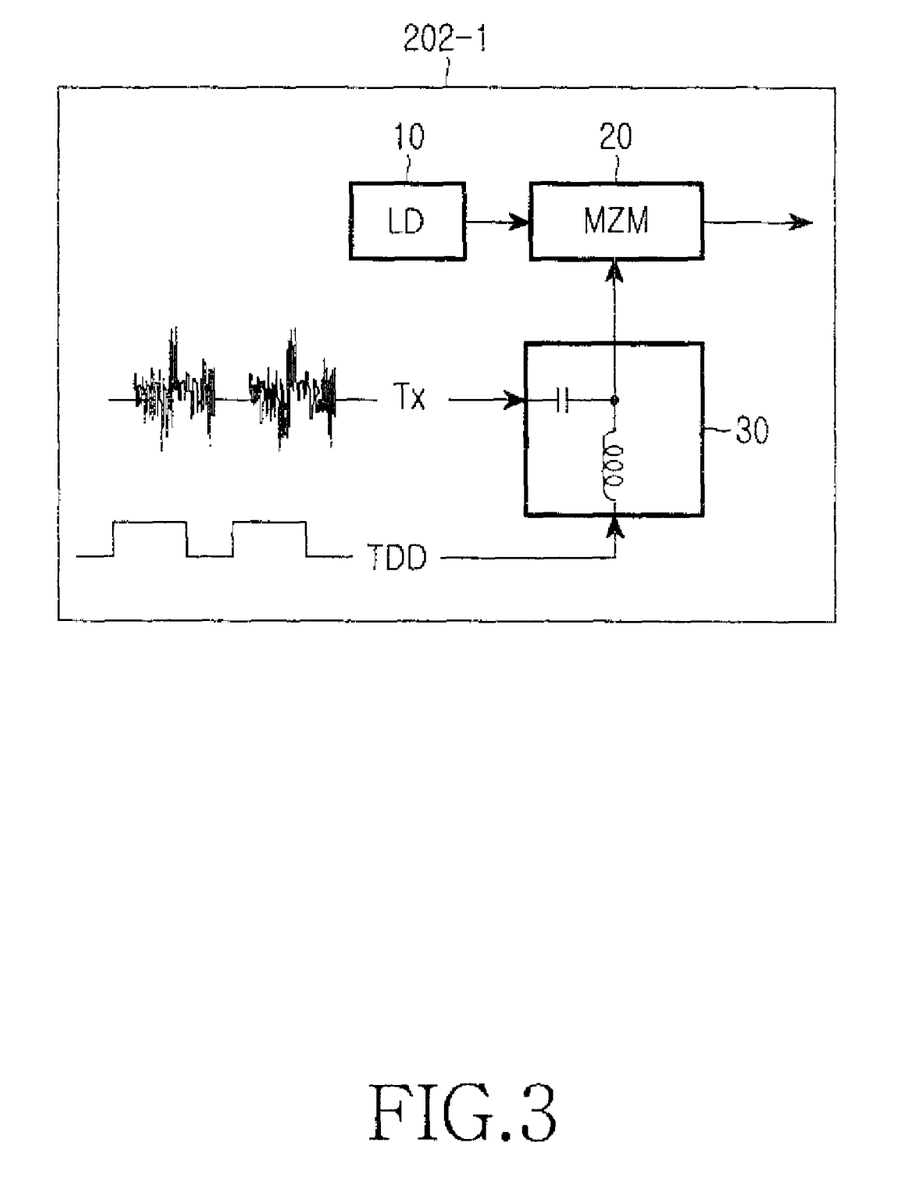
FIG. 3 is a view illustrating a construction of an electro-optic converter of a center site according to one exemplary embodiment of the present invention.

FIG. 3 is a view illustrating a construction of an electro-optic converter 202-1 according to one exemplary embodiment of the present invention. The electro-optic converter includes a laser diode 10, a Mach-Zehnder modulator 20, and a Bias-T 30. DC optical signals are generated from the laser diode 10 and modulation is performed by the Mach-Zehnder interferometer type modulator 20. The Bias-T 30 includes a capacitor (C) and an inductor (L), and the RF signals (Tx) are applied to the Mach-Zehnder modulator 20 via the capacitor and the TDD signals are applied to the Mach-Zehnder modulator 20 via the inductor.

Figure 4:
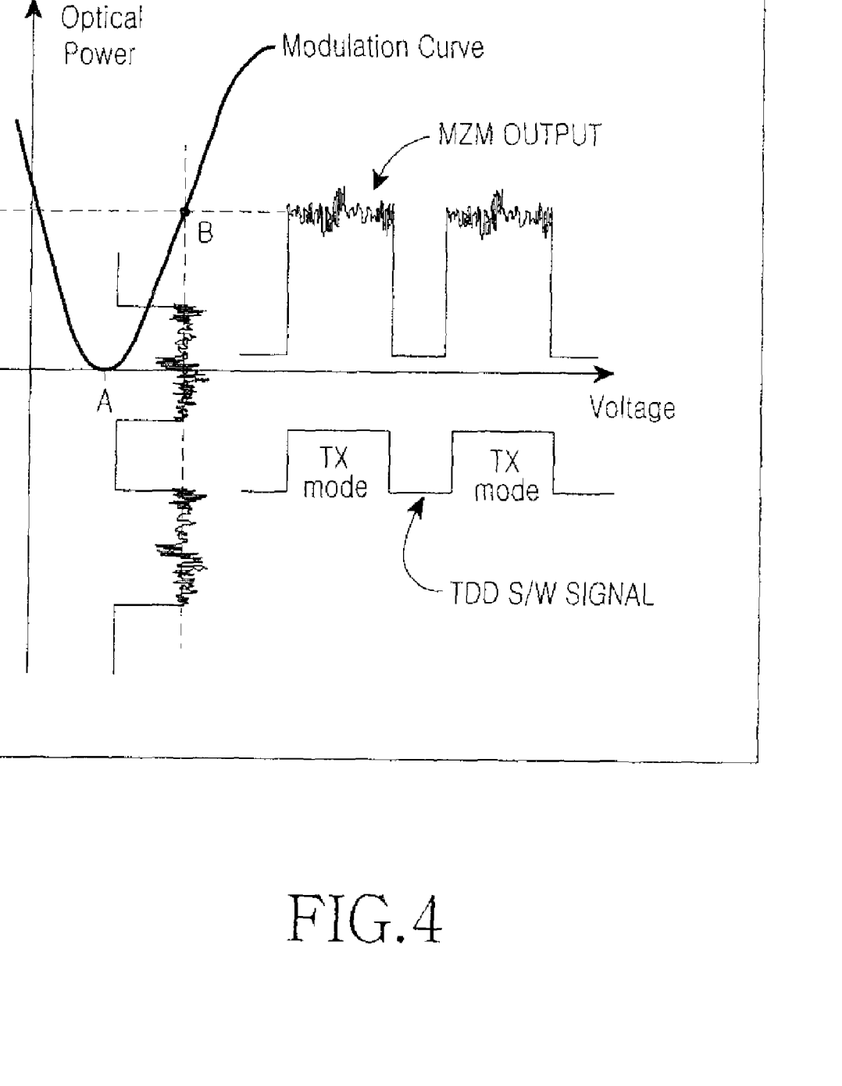
FIG. 4 is a graph illustrating an optical output power waveform of the electro-optic converter shown in FIG. 3.

FIG. 4 is a graph illustrating an optical output power waveform of the example of an electro-optic converter shown in FIG. 3. It should be noted that, when RF signals (Tx) and TDD signals are mixed and the mixed signals are applied to the Mach-Zehnder modulator 20 between a null point (A) and an operation point (B) on a modulation curve of the Mach-Zehnder modulator, RF signals (Tx) are output only if the TDD signals are high.

Since the Mach-Zehnder modulator generally has a superior extinction ratio of more than 20 dB, optical power of the Rx mode having a value lower by around 20 dB than that of the Tx mode can be output. In the following calculation, the RIN noise is suppressed by approximately 40 dB and it has a very small value of −93 dBm/100 MHz.

$RIN=-120$ dB/Hz, $P_{in}=-20$ dBm, $R_{responsivity}=1$,
$R_{Load}=50$ ohm, BW=100 MHz $$P_{RIN} = [-120 + (-50) \times 2 + 0 + 17 + 80] + 30$$
$$= -93 \text{ dBm}/100 \text{ MHz}$$

When the RIN noise has a value of −93 dBm/100 MHz, the value of noise, which is generated by crosstalk of a transmission path (Tx path) and input to a reception path (Rx path), is calculated as follows.

−93 dBm (output level of O/E converter in Rx mode, embodiment) +

5 dB (total RF Gain of HPA, embodiment) −

25 dB (Switch isolation) = −113 dBm/100 MHz

A analysis of the calculation shows that noise having a value of −113 dBm/100 MHz is being generated by crosstalk of a transmission path (Tx path) and input to a reception path (Rx path). This value is much smaller than that of thermal noise having a value of 94 dBm/100 MHz and has nearly no influence on the reception sensitivity. The RIN noise has a value suppressed below the thermal noise and even under an assumption that the RIN has a value of −120 dB/Hz (i.e. the worst condition). Therefore, it can be noted that this is greatly effective.

Although the Bias-T is realized with a capacitor and an inductor in the present exemplary embodiment, the present exemplary embodiment is not limited and various embodiments are possible.

Figure 5:
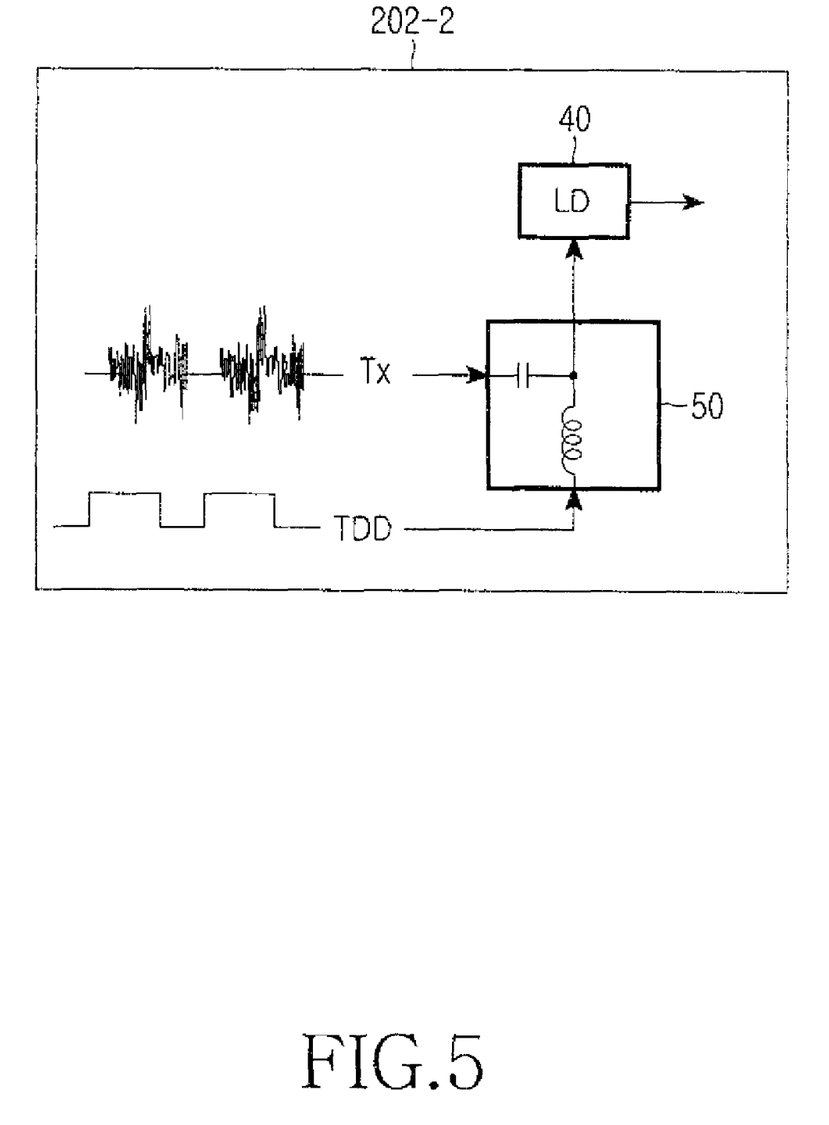
FIG. 5 is a view illustrating a construction of an electro-optic converter of a center site according to another exemplary embodiment the present invention.

FIG. 5 is a view illustrating a construction of an example of an electro-optic converter 202-2 of the center site according to another exemplary embodiment of the present invention. The electro-optic converter includes a laser diode 40 and a Bias-T 50. The RF signals (Tx) and the TDD switch signals are mixed by the Bias-T 50 and the mixed signals are applied to the laser diode 40, so that the applied signals are converted into optical signals.

Figure 6:
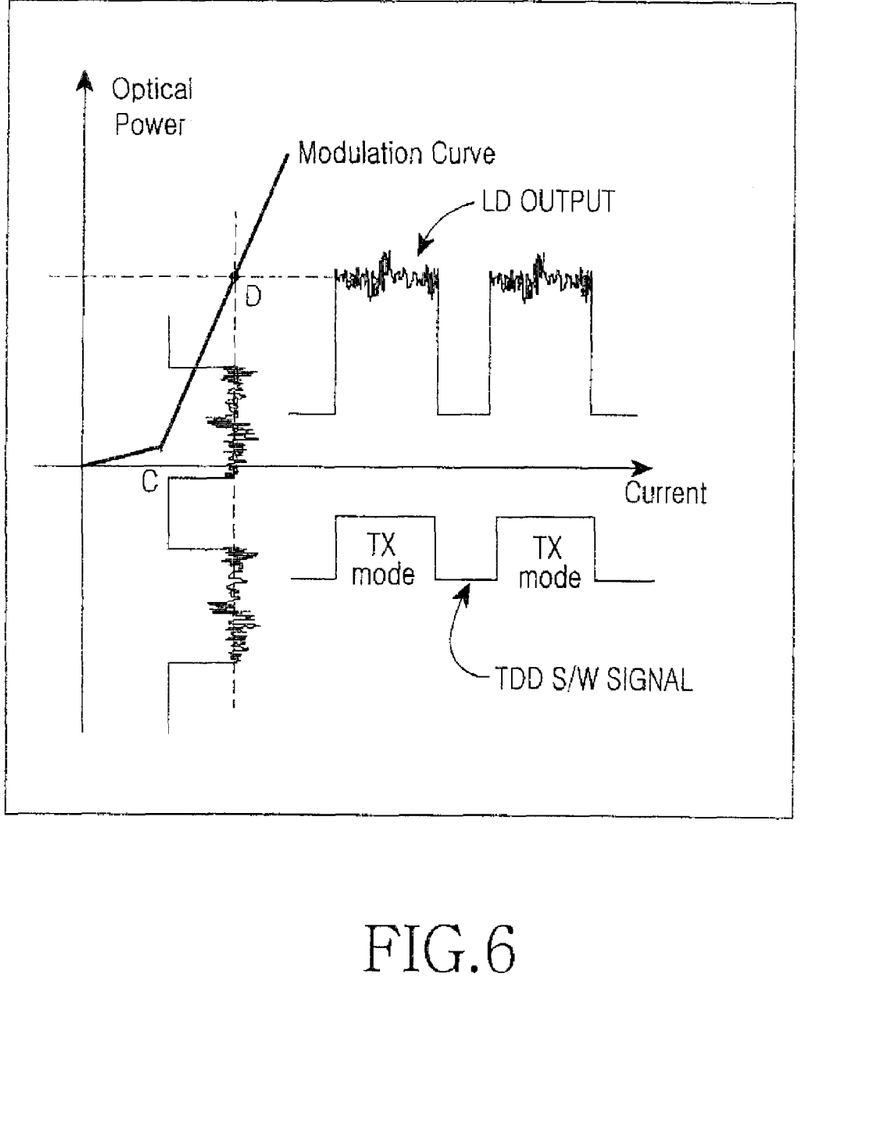
FIG. 6 is a graph illustrating an optical output power waveform of the electro-optic converter shown in FIG. 5.

FIG. 6 is a graph illustrating an optical output power waveform of the electro-optic converter shown in FIG. 5. Likewise, it can be noted that, when the RF signals (Tx) and the TDD switch signals are mixed and the mixed signals are applied to the laser diode between a null point (C) and an operation point (D) on the modulation curve, the RF signals (Tx) are output only if the TDD switch signals are high.

A laser diode generally has an extinction ratio of around 10 dB. In the case in which a laser diode must be completely turned off to ensure a higher extinction ratio, it is actually impossible to allow the laser diode to operate at a stable state after the laser diode is turned on again within a TDD switching time. The reason that the laser diode is not stable within a TDD switching time is because several micro-seconds or several seconds is required to control Proportional Integral Differential (PID) in order to always keep a constant bias current of a semiconductor laser.

Therefore, without completely turning off the laser diode and by using the characteristic of the RIN noise in proportion to the square of power, it is possible to output the optical power of the Rx mode having a value around 10 dB lower than that of the Tx mode. In this case, as can be seen from the following calculation, the RIN noise is suppressed by approximately 20 dB and has a small value of −73 dBm/100 MHz.

$RIN=-120$ dB/Hz, $P_{in}=-10$ dBm, $R_{responsivity}=1$,
$R_{Load}=50$ ohm, BW=100 MHz $$P_{RIN} = [-120 + (-40) \times 2 + 0 + 17 + 80] + 30$$
$$= -73 \text{ dBm}/100 \text{ MHz}$$

When the RIN noise has a value of −73 dBm/100 MHz, the value of noise, which is generated by crosstalk of a transmission path (Tx path) and input to a reception path (Rx path), is calculated as follows.

−73 dBm (output level of O/E converter in Rx mode, embodiment) +

5 dB (total RF Gain of HPA, embodiment) −

25 dB (Switch isolation) = −93 dBm/100 MHz

An analysis of the calculation shows noise having a value of −93 dBm/100 MHz is being generated by crosstalk of a transmission path (Tx path) and input to a reception path (Rx path). This value of the noise is almost identical with that of thermal noise and thus the reception sensitivity is hardly influenced. In this case, it is noted that the noise has a value suppressed as much as thermal noise even under an assumption that the RIN has a value of −120 dB/Hz (i.e. the worst condition).

As described above, the reduction of noise, which is generated by crosstalk of a transmission path and input to a reception path (i.e. Tx noise leakage level), causes a very high SNR value in the Rx mode, which improves the reception sensitivity and thus enables the TDD communication.

Although not shown in a separate drawing, the center site 200 is typically connected to a plurality of remotes through an optical fiber, so that the optical repeater coverage can be extended. To this end, the center site may include a signal divider and a signal coupler having multi-channels. The signal divider ramifies RF signals delivered from the AP (i.e. an upper layer) so as to deliver the resulting signals to a gain amplifier, and the coupler couples RF signals received from an LNA with output signals of other remotes so as to transmit the resulting signals to the AP through an RF cable.

Figure 7:
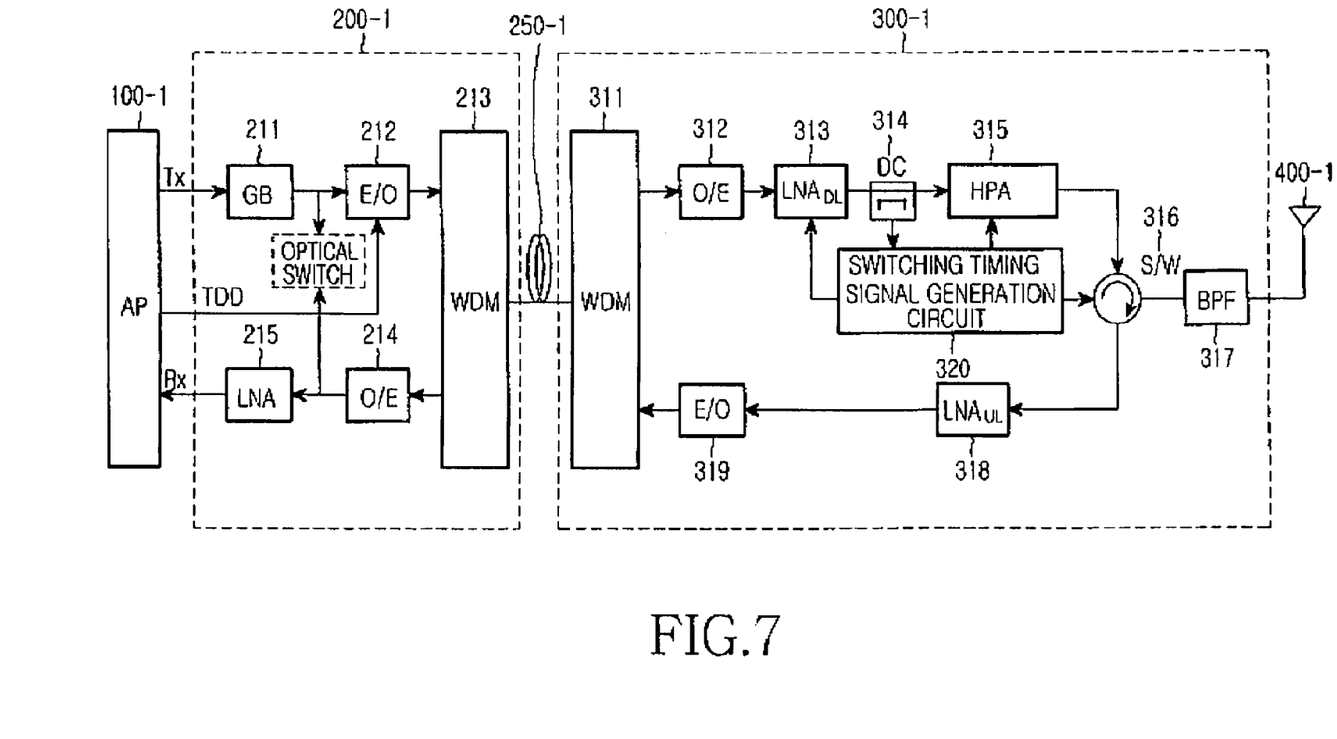
FIG. 7 is a block diagram illustrating a construction of an RoF link apparatus for transmitting/receiving radio frequency up/downlink signals in a TDD mobile communication system according to a second exemplary embodiment of the present invention.

FIG. 7 is a block diagram illustrating a construction of an RoF link apparatus for transmitting/receiving radio frequency up/downlink signals in a TDD mobile communication system according to a second exemplary embodiment of the present invention.

Referring to FIG. 7, the RoF link apparatus according to the present exemplary embodiment includes a center site 200-1 connected with the AP 100-1 of the mobile communication system through an RF cable, and a remote 300-1 of the optical repeater connected with the center site 200-1 through an optical fiber 250-1. The center site 200-1 converts the RF signals received from the AP 100-1 into optical signals through the electro-optic conversion and transmits the resulting signals to the remote 300-1 of the optical repeater through the optical fiber 250-1. The center site 200-1 also converts optical signals received from the remote 300-1 into RF signals through photoelectric conversion and transmits the resulting signals to the AP 100-1 through an RF cable. The remote 300-1 of the optical repeater converts the optical signals received from the center site 200-1 into RF signals through the photoelectric conversion and transmits the resulting signals to a portable terminal (not shown) through an antenna 400-1. The remote 300-1 of the optical repeater also converts RF signals received from the portable terminal into optical signals through electro-optic conversion and transmits the resulting signals to the center site 200-1 through the optical fiber 250-1.

The construction of the remote 300-1 of the optical repeater and the center site 200-1 will be described in more detail herein below.

The center site 200-1 includes a Gain Block 211, an electro-optic converter (E/O) 212, a WDM 213, a photoelectric converter (O/E) 214, and an LNA 215. The remote 300-1 of the optical repeater includes a WDM 311, a photoelectric converter (O/E) 312, an LNADL 313, a DC coupler 314, a HPA 315, a circulator 316, a BPF 317, an LNAUL 318, an electro-optic converter (E/O) 319, and a switching timing signal generation circuit 320.

The construction of the present exemplary embodiment corresponds to an example, which employs a circulator instead of a switch of FIG. 2 and is used in a place requiring low transmission power. An operational principle of the construction of the present exemplary embodiment is similar to that of FIG. 2, so a repetitive description thereof will be omitted here.

Figure 8:
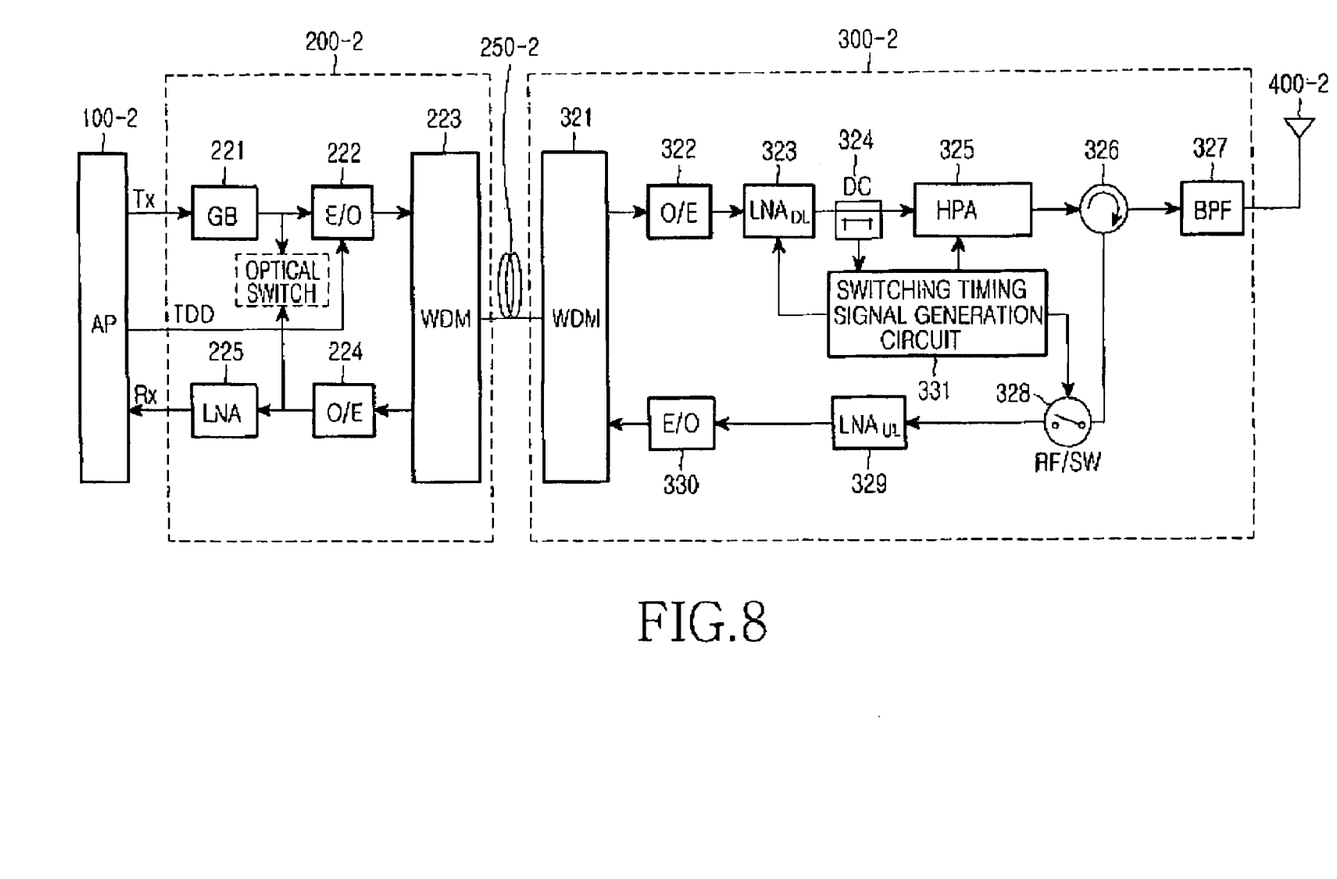
FIG. 8 is a block diagram illustrating a construction of an RoF link apparatus for transmitting/receiving radio frequency up/downlink signals in a TDD mobile communication system according to a third exemplary embodiment of the present invention.

FIG. 8 is a block diagram illustrating a construction of an RoF link apparatus for transmitting/receiving radio frequency up/downlink signals in a TDD mobile communication system according to a third exemplary embodiment of the present invention.

Referring to FIG. 8, the RoF link apparatus according to the present exemplary embodiment includes a center site 200-2 connected with the AP 100-2 of the mobile communication system through an RF cable, and a remote 300-2 of the optical repeater connected with the center site 200-2 through the optical fiber 250-2.

Still referring to FIG. 8, the center site 200-2 includes a Gain Block 221, an electro-optic converter (E/O) 222, a WDM 223, a photoelectric converter (O/E) 224, and an LNA 225.

The remote 300-2 of the optical repeater includes a WDM 321, a photoelectric converter (O/E) 322, an LNADL 323, a DC coupler 324, a HPA 325, a circulator 326, a BPF 327, an RF switch 328, an LNAUL 329, an electro-optic converter (E/O) 330, and a switching timing signal generation circuit 331.

The construction of the present exemplary embodiment corresponds to an example, which employs a circulator and a switch instead of the switch 306 of FIG. 2. The construction of the present exemplary embodiment is typically suitable in a place requiring high transmission power. An operation principle of the construction of the present exemplary embodiment is the same as that of FIG. 2, so a repetitive description thereof will be omitted here.

According to another exemplary embodiment of the present invention, an optical switch controlled by TDD switch signals can be also arranged before the electro-optic converter or the photoelectric converter. In general, there can be a significant degree of difficulty to actually adopt and use an optical switch satisfying a switching time of a microsecond length, which is required by a TDD switch of a next generation mobile communication system such as an IMT-advanced system, because such optical switches with such switching times are now very expensive. However, if an optical switch satisfying such conditions can be implemented at low cost, an optical switch can be arranged before the electro-optic converter or the photoelectric converter without use of TDD switch signals as bias control signals.

While the invention has been shown and described with reference to certain exemplary embodiments thereof, it will be understood by those skilled in the art that various changes in form and details may be made therein without departing from the spirit of the invention and the scope of the appended claims.

According to the present invention as described in the above-mentioned examples, in an RoF link apparatus for transmitting up/downlink signals of a TDD wireless communication system, the bias control of an electro-optic converter is achieved by applying TDD switch signals. As a result, it is possible to reduce a level of the transmission noise leakage (Tx noise leakage) accumulated due to RIN noise occurring in an electro-optic converter of a center site in an Rx mode. Therefore, it is possible to achieve a TDD based RoF link apparatus by increasing the SNR value.

Moreover, according to the present invention, an electro-optic converter is turned on/off by TDD switch signals, so that it is possible to reduce the entire consumed power and improve the system efficiency.

What is claimed is:

1. A radio over fiber link apparatus for transmitting/receiving radio frequency up/downlink signals in a Time Division Duplex(TDD) mobile communication system, the radio over fiber link apparatus comprising:
a center site comprising:
a gain block for:
receiving the radio frequency signals from the access point of the mobile communication system,
amplifying signal components after reducing a noise component of the radio frequency signals, and
outputting the amplified signals; and
a first electro-optic converter comprising:
an optical signal generator for generating optical signals;
an interferometer type modulator for modulating optical signals generated from the optical signal generator; and
a Bias-T for receiving the amplified signals from the gain block-through one port thereof, and receiving TDD signals through another port thereof and providing the received TDD signals as bias signals to the modulator, and outputting the modulated optical signals as optical signals; and
a remote site for:
receiving the optical signals converted by the first electro-optic converter;
converting the optical signals back into radio frequency signals; and
transmitting the radio frequency signals, wherein the remote site includes a first photoelectric converter for converting each of the optical signals transmitted from the center site into a corresponding radio frequency signal.

2. The radio over fiber link apparatus according to claim 1, further comprising:

an optical fiber that optically links the center site to the remote site for two-way communication between the center site and the remote site; and an antenna being in communication with the remote site for transmitting the radio frequency signals to a mobile communication terminal within a transmission range of the radio frequency signals.

3. The radio over fiber link apparatus as claimed in claim 2, wherein the center site further comprises:

a first WDM for:

multiplexing the optical signals, transmitted from the first electro-optic converter, at different wavelengths and transmitting the multiplexed signals to the remote site through the optical fiber, and de-multiplexing the optical signals transmitted through the optical fiber from the remote site at different wavelengths;

a photoelectric converter for converting the optical signals transmitted from the first WDM into radio frequency signals; and a first low noise amplifier for amplifying the radio frequency signals transmitted from the photoelectric converter until they have Root Mean Square (RMS) power sufficient for wireless transmission, so as to transmit the amplified signals to the access point of the mobile communication system.

4. The radio over fiber link apparatus as claimed in claim 3, wherein the remote site further comprises:

a second WDM for:

de-multiplexing the optical signals transmitted through the optical fiber from the center site into optical signals having different wavelengths as de-multiplexed signals for input to the first photoelectric converter, and multiplexing optical signals for transmission from the remote site to the center site through the optical fiber at different wavelengths;

a second low noise amplifier for substantially eliminating noise in the radio frequency signals transmitted from the first photoelectric converter and amplifying only a signal component;

a coupler for extracting a portion of the radio frequency signals from the second low noise amplifier;

a high power amplifier for amplifying the radio frequency signals transmitted from the second low noise amplifier until the radio frequency signals transmitted from the second low noise amplifier have an RMS power suitable for wireless transmission to a mobile communication terminal;

a third low noise amplifier for eliminating noise of radio frequency signals transmitted from the antenna and amplifying only a signal component of the radio frequency signals;

a second electro-optic converter for converting radio frequency signals transmitted from the third low noise amplifier into optical signals;

a switch for transmitting the radio frequency signals transmitted from the high power amplifier to the antenna in transmit mode and providing the radio frequency signals transmitted from the antenna to the third low noise amplifier in a receive mode; and a switching timing signal generation circuit for controlling the switch after dividing a downlink and an uplink by radio frequency signals extracted from the coupler.

5. The radio over fiber link apparatus as claimed in claim 1, wherein the bias signals are applied to a point between a null point and an operation point on a modulation curve of the optical signal generator.

6. The radio over fiber link apparatus as claimed in claim 1, wherein the optical signal generator includes a laser diode.

7. The radio over fiber link apparatus as claimed in claim 1, wherein the interferometer type modulator comprises a Mach-Zehnder (MZ) modulator, and wherein the Bias-T comprises a capacitor and an inductor, and the TDD signals are applied to the modulator via the inductor.

8. The radio over fiber link apparatus as claimed in claim 1, wherein an optical power in the mode is about 20 dB lower than an optical power of the transmit mode.

9. A center site apparatus for radio over fiber link transmission, said apparatus comprising:

a first electro-optic converter comprising:

an optical signal generator for generating optical signals;

an interferometer type modulator for modulating optical signals generated from the optical signal generator; and a Bias-T for receiving radio frequency signals through one port thereof, and receiving TDD signals through another port thereof and providing the received TDD signals as bias signals of the modulator, a gain block for:

receiving radio frequency signals, amplifying signal components after reducing a noise component of the radio frequency signals, and providing the amplified signals as input signals to the first electro-optic converter; and a first WDM for:

multiplexing the optical signals, transmitted from the first electro-optic converter, at different wavelengths and transmitting the multiplexed signals to a remote site through an optical fiber, and de-multiplexing the optical signals transmitted through the optical fiber from the remote site at different wavelengths;

a first photoelectric converter for converting each of the optical signals transmitted from the first WDM into a corresponding radio frequency signal; and a first low noise amplifier for amplifying the radio frequency signals transmitted from the photoelectric converter until they have Root Mean Square (RMS) power sufficient to, transmit the amplified signals.

10. The center site apparatus as claimed in claim 9 wherein the interferometer type modulator comprises a Mach-Zehnder (MZ) modulator, and wherein the Bias-T comprises a capacitor and inductor, and the TDD signals are applied to the modulator via the inductor.

11. The center site apparatus as claimed in claim 9, wherein the bias signals are applied to a point between a null point and an operation point on a modulation curve of the optical signal generator.

12. The center site apparatus as claimed in claim 9, wherein the optical signal generator includes a laser diode.

13. A remote site apparatus for radio over fiber link transmission, said apparatus comprising:

a first photoelectric converter for converting optical signals received from a center site into radio frequency signals;

a WDM for:

de-multiplexing the optical signals received through an optical fiber from the center site into optical signals having different wavelengths as de-multiplexed signals for input to the first photoelectric converter, and
multiplexing optical signals for transmission from the remote site to the center site through an optical fiber at different wavelengths;

a low noise amplifier for:
substantially eliminating noise in the radio frequency signals transmitted from the first photoelectric converter, and
amplifying only a signal component;

a coupler disposed between the low noise amplifier and a high power amplifier for extracting a portion of the radio frequency signals from the low noise amplifier and outputting the portion of the radio frequency signals to a switching timing signal generation circuit;

the high power amplifier for amplifying the radio frequency signals transmitted from the low noise amplifier until the radio frequency signals transmitted from the low noise amplifier have an RMS power suitable for wireless transmission to a mobile communication terminal;

a second low noise amplifier for:
eliminating noise of radio frequency signals transmitted from an antenna; and
amplifying only a signal component of the radio frequency signals;

an electro-optic converter for converting radio frequency signals transmitted from the second low noise amplifier into optical signals;

a switch for transmitting the radio frequency signals transmitted from the high power amplifier to the antenna in a transmit mode and providing the radio frequency signals transmitted from the antenna to the second low noise amplifier in a receive mode; and the switching timing signal generation circuit for controlling the switch after dividing a downlink and an uplink by the portion of radio frequency signals extracted from the coupler.

14. The remote site apparatus as claimed in claim 13, wherein an optical power in the receive mode is about 20 dB lower than an optical power of the transmit mode.

15. The remote site apparatus as claimed in claim 13, further comprising a Band-Pass Filter positioned between the switch and the antenna.

* * * * *